Nov. 20, 1945.  R. C. MANNING  2,389,377
LOCK NUT
Filed May 19, 1944

INVENTOR.
RICHARD C. MANNING
BY
ATTORNEY.

Patented Nov. 20, 1945

2,389,377

UNITED STATES PATENT OFFICE 2,389,377

LOCK NUT

Richard C. Manning, San Gabriel, Calif.

Application May 19, 1944, Serial No. 536,232

3 Claims. (Cl. 151—7)

The invention relates to a nut which is adapted to serve in certain situations as a lock nut and in other situations as both a lock nut and a pressure seal nut to seal off the flow of fluid under pressure. The invention also relates to the method of making such a nut.

An object of the invention is to simplify the manufacture and improve the efficiency of nuts of the type above described. The manufacture is simplified through forming a nut of composite material one of which is softer than the other and by forming threads in both thereof in a single operation. The softer material is used for a lock nut section provided with an extension beyond the base of the nut, whereby when the nut is screwed home against a fish plate or the like or against a hydraulic fitting, the threads on the softer lock nut section are jammed or wedged against their mating male threads, and also in the case of hydraulic fittings, the nut seals against flow both between the the base of the nut and the fitting and along the threads. The efficiency of such a nut when serving as a lock nut is improved through rigidly connecting the lock nut section to the body of the nut, whereby enough wedging action is permitted between the lock nut threads and the male threads when the nut is screwed into place, without permitting loose play between the lock nut section and the nut proper, thereby reducing the tendency of the male threads to cut independent threads in the lock nut section. Also, as a thread having the same pitch is carried through the bore of the nut and the lock nut section, the nut is readily threaded onto or off from the male threads. When operating as a pressure seal nut, the efficiency of the sealing action is improved through employing a unitary member, namely, the threaded lock nut section, which effects both a seal between the base of the nut and the base of the pressure fitting and a seal between the threads of the lock nut section and the cooperating male threads on the fluid pressure pipe threaded into the fitting.

A thread of the same pitch and size is formed in both the nut and lock nut section by integrally uniting or rigidly connecting a nut blank having an unthreaded bore and a lock nut blank also having an unthreaded bore, and by threading the same as a unit in one operation.

For further details of the invention, reference may be made to the drawing, wherein Fig. 1 is a perspective view of a nut adapted to serve either as a lock nut or as both a lock nut and a pressure seal nut, according to the present invention.

Figure 3:
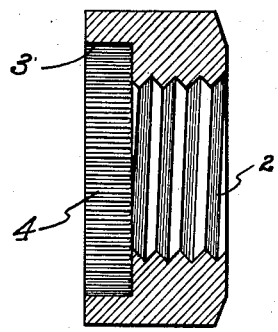
Fig. 3 is a sectional view of the lock nut of Fig. 1 with the lock nut section removed.

Referring in detail to the drawing, the lock nut I has a body portion of comparatively hard material such as steel or the like, and rigidly connected therewith is a lock nut section 5 in the form of a ring of comparatively soft material such as fiber, lead, etc., arranged in an annular recess 3 in the base of the nut I. The lock nut section or ring 5 may be integrally united and rigidly secured in the recess 3 by arranging a tight fit between these members and forcing the ring 5 into the recess 3 which may have longitudinal serrations 4 which are substantially parallel to the axis of nut I to interlock the ring 5 with the nut I and prevent the ring 5 from turning with respect to the nut I. The nut I is provided with the usual central bore having a thread 2 and a thread of the same size and pitch, that is a continuation of thread 2 as shown by thread 6, is provided in the bore of the ring 5. The threads 2 and 6, one being a continuation of the other, are former as follows. A nut blank as shown in Fig. 3, except with an unthreaded bore instead of the threads 2, is provided and into the recess 3 is press-fitted the ring 5 also having an unthreaded bore substantially the same size as the bore in the nut blank. In one threading operation, the threads 2 and 6 are formed, whereby in effect a single thread of the same size and pitch is formed in the nut I and the ring 5.

The ring 5 is of relatively soft material which in some cases may be fiber and in other cases may be of lead, bronze, copper, aluminum or other material softer than nut I which may be of steel or other material.

Figure 1:
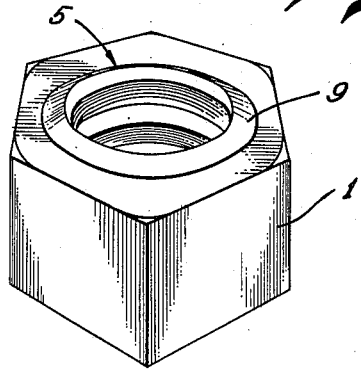

The ring 5 is provided with an extension 9 which projects beyond the face of the base of the nut I as shown in Fig. 1. This is accomplished by making the ring 5 with a flat tapered face 9 which tapers away from the base of the nut I. The thread 6 thus extends beyond the base of nut I.

Figure 2:
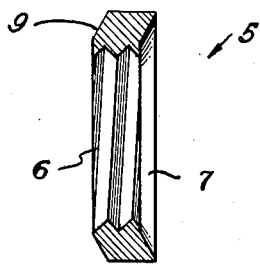
Fig. 2 is a sectional view of one form of lock nut section.

When employing material such as fiber for the ring 5, which material has a slight amount of elasticity, the locking and sealing action of the ring 5 may be enhanced by providing it with an annular recess or counter-bore 7 in order to facilitate a slight axial movement of thread 6 inwardly of nut I when the hydraulic fitting or fish plate which has a flat face serves as an abutment for the extension 9 when the nut I is being screwed onto a pipe threaded onto the fitting, or onto a bolt. As shown in Fig. 2, ring 5 has substantially parallel inclined ends and hence the thread 6 extends over an axial length which is displaced longitudinally with respect to the periphery of ring 5. The depth of recess 3 is substantially the same as the length of the periphery of ring 5 at its greatest diameter, whereby, where ring 5 is inserted in recess 3, one end of ring 5 will protrude beyond the face of nut 1, and the other end of ring 5 will be inclined with respect to the end wall of recess 3 to provide a space which facilitates movement of the inclined ends of ring 5 toward a plane at right angles to the longitudinal axis of nut 1, whereby thread 6 is forced into tight engagement with the threads of the bolt.

When employed as a lock nut, it is assumed that in addition to a member having male threads, such as a bolt, there is a member, such as a fish plate against which the extended portion 9 is forced when the nut 1 is screwed in place. The ring 5 is thus squeezed between the recess 3 in the nut 1 and the fish plate and the threads 6 are thus compressed or wedged against the mating male threads to lock the nut in place and prevent its loosening from shock or vibration or the like.

If instead of being threaded on a bolt, the nut 1 is threaded on a pipe which conveys liquid or gas under pressure, the pipe being threaded in a fitting having a flat face against which the extension 9 abuts, then when the nut is forcibly screwed in place, the extension 9 flattens out in a plane parallel to the base of the nut 1 against the face of the fitting and in so doing operates as a sealing face or seal to prevent leakage of the fluid between the sealing face 9 and the fitting, due to the pressure between these parts. Also, leakage is prevented between the threads 6 and their mating threads due to the pressure or wedging action between the sides of these two sets of threads, and also the nut 1 is prevented from loosening when subjected to vibration or shock due to the locking action between the threads 6 and their mating male threads.

It has been found that the same nut can be used numerous times while still retaining its locking or its locking and sealing qualities.

It will be apparent that various modifications may be made in the invention and that a wide variety of materials may be employed for the body of the nut 1 and for the ring or locking section 5, but in any case the nut 1 should preferably be of harder material than the locking section.

I claim:

1. A lock nut comprising a nut having a body portion of comparatively hard material and having a screw thread on a portion of its bore, with a recess around said bore at the base of said nut, an annular lock nut section of comparatively soft material in said recess and rigidly united therewith, said lock nut section having a screw thread forming a continuation of the thread in said body portion and of the same pitch, said lock nut section having an extension beyond the face of the base of said body portion, said lock nut section adjacent the end thereof opposite said extension being provided with an annular recess facilitating locking action of said lock nut section.

2. A lock nut comprising a nut having a body portion having a screw thread on a portion of its bore, with a recess having an end wall around said bore at the base of said nut, said bore having peripheral serrations extending substantially parallel to the axis of said body portion, an annular lock nut section in said recess and having its periphery interfitting with said serrations, said lock nut section having a screw thread forming a continuation of the thread in said body portion and of the same pitch, said lock nut section having substantially parallel inclined ends, with one of said ends projecting beyond said body portion and the other end inclined with respect to the end wall of said recess.

3. A lock nut comprising a nut having a body portion having a screw thread on a portion of its bore, with a recess around said bore at the base of said nut, an annular lock nut section in said recess and non-rotatively interlocked therewith, said lock nut section having a screw thread forming a continuation of the thread in said body portion and of the same pitch, said lock nut section having an extension beyond the face of the base of said body portion, the thread portion of said lock nut section being offset in an axial direction with respect to both ends of the periphery of said lock nut section.

RICHARD C. MANNING.